US005744270A

United States Patent [19]

Pearlman et al.

[11] Patent Number: 5,744,270

[45] Date of Patent: Apr. 28, 1998

[54] CODED MARKING ON AN INTERIOR SURFACES OF A CRT FACEPLATE PANEL AND METHOD OF MAKING SAME

[75] Inventors: Samuel Pearlman, Lancaster; Robert Anthony Duschl, Lititz; Anthony Stanley Baran, Lancaster; Glenn William Brunner, Landisville; George Simon Gadbois; Frank Thomas DiAugustine, both of Lancaster, all of Pa.

[73] Assignee: Thomson Consumer Electronics, Inc., Indianapolis, Ind.

[21] Appl. No.: 620,741

[22] Filed: Mar. 18, 1996

Related U.S. Application Data

[62] Division of Ser. No. 287,331, Aug. 8, 1994, abandoned.

[51] Int. Cl.[6] .............................. G03B 41/00; G03C 5/00

[52] U.S. Cl. ................................ 430/25; 430/26; 427/68; 427/66; 396/546; 396/542

[58] Field of Search .................................... 396/546, 547; 430/24, 25, 26; 427/68, 64, 66

[56] References Cited

U.S. PATENT DOCUMENTS

| | | | |
|---|---|---|---|
| 3,558,310 | 1/1971 | Mayaud | 96/36.1 |
| 3,954,470 | 5/1976 | Barczynski et al. | 396/546 |
| 4,021,819 | 5/1977 | Barczynski et al. | 354/1 |
| 4,095,095 | 6/1978 | Muraoka et al. | 235/219 |
| 4,323,755 | 4/1982 | Nierenberg | 219/121 |
| 4,337,304 | 6/1982 | Brenner et al. | 430/24 |
| 4,374,451 | 2/1983 | Miller | 445/22 |
| 4,374,452 | 2/1983 | Koorneff | 445/66 |
| 4,377,890 | 3/1983 | Miller | 313/477 R X |
| 4,497,848 | 2/1985 | Baran | 427/106 |
| 4,515,867 | 5/1985 | Bleacher et al. | 313/477 R X |
| 5,082,755 | 1/1992 | Liu | 430/5 |
| 5,214,350 | 5/1993 | Remec et al. | 313/477 R |

FOREIGN PATENT DOCUMENTS

| | | | |
|---|---|---|---|
| 0643412 | 8/1994 | European Pat. Off. . | |
| 643412 | 3/1995 | European Pat. Off. | H01J 9/00 |
| 52-052564 | 4/1977 | Japan | 427/68 |
| 60-232632 | 11/1985 | Japan | 396/546 |
| 61-232529 | 10/1986 | Japan | 427/68 |
| 62-128419 | 6/1987 | Japan | H01J 29/88 |

(List continued on next page.)

OTHER PUBLICATIONS

Technochemical Processes of Electrovacuum Manufacture, pp. 278–281 with translation.
Translation of JP 62–128419.
Translation of JP 2–061934.

*Primary Examiner*—Martin Angebranndt
*Attorney, Agent, or Firm*—Joseph S. Tripoli; Dennis H. Irlbeck; Vincent J. Coughlin, Jr.

[57] ABSTRACT

The novel method for producing a coded marking on a CRT faceplate panel having an exterior and an interior surface with a viewing area surrounded by a periphery and having a luminescent screen with a plurality of different light-emitting phosphors separated by light-absorbing material includes the steps of: depositing a suitable photoresist on the interior surface of the panel to form a layer that extends across the viewing area and onto the periphery; illuminating areas of the photoresist on both the viewing area and the periphery with actinic radiation to selectively change the solubility of the photoresist; developing the photoresist to remove the more soluble areas, thereby exposing underlying portions of the interior surface of the panel while leaving retained areas of less soluble photoresist. The retained areas of the photoresist and the exposed portions of the interior surface of the panel are then overcoated with a light-absorbing material which is dried to form a coating. The light-absorbing coating is developed by removing the retained areas of the photoresist having the overlying light-absorbing coating thereon, while leaving the coating of light-absorbing material adhered to the exposed portions of the interior surface of the panel. The developing step forms openings in the light-absorbing coating on the viewing area and a coded marking, including a pattern of light-absorbing material and open areas, on the periphery of the panel.

6 Claims, 7 Drawing Sheets

FOREIGN PATENT DOCUMENTS

| | | | |
|---|---|---|---|
| 1077846 | 3/1989 | Japan | H01J 29/32 |
| 2-061934 | 3/1990 | Japan . | |
| 2061934 | 3/1990 | Japan | H01J 9/20 |
| 2-288391 | 11/1990 | Japan . | |
| 4245141 | 9/1992 | Japan | H01J 17/49 |
| 5-054794 | 3/1993 | Japan . | |
| 5-190095 | 6/1993 | Japan | 430/24 |
| 5151913 | 6/1993 | Japan | 313/477 R |

Fig. 1
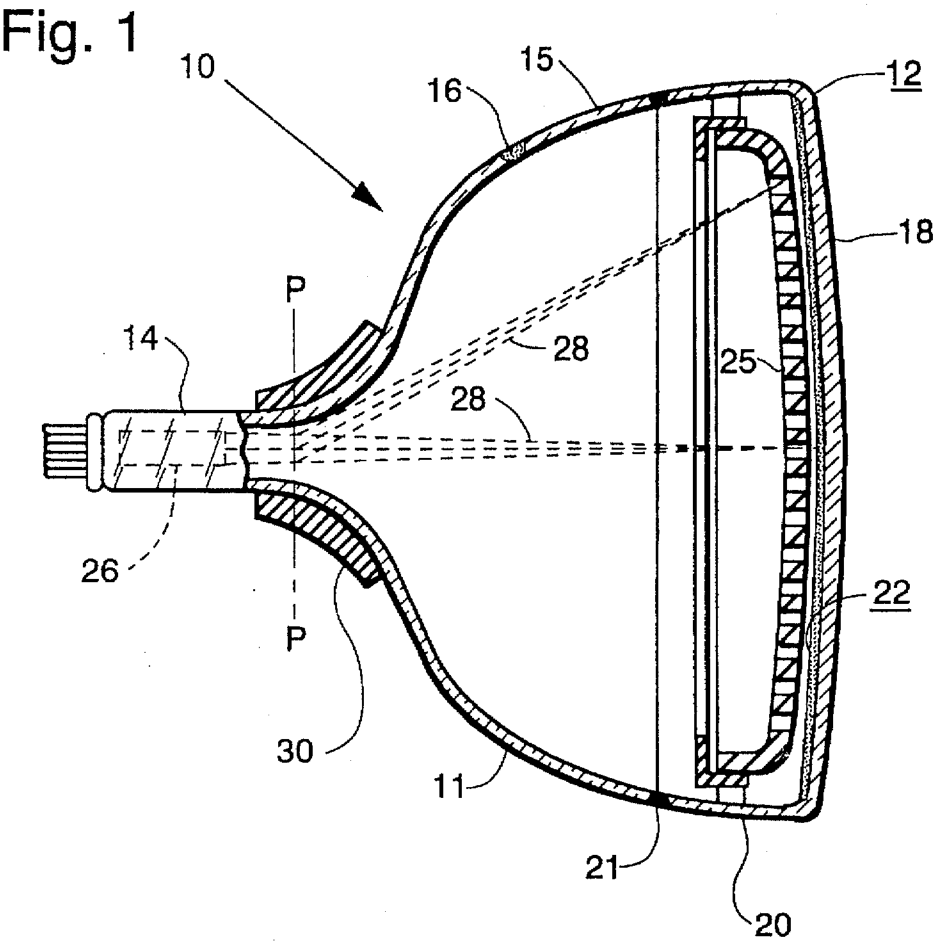
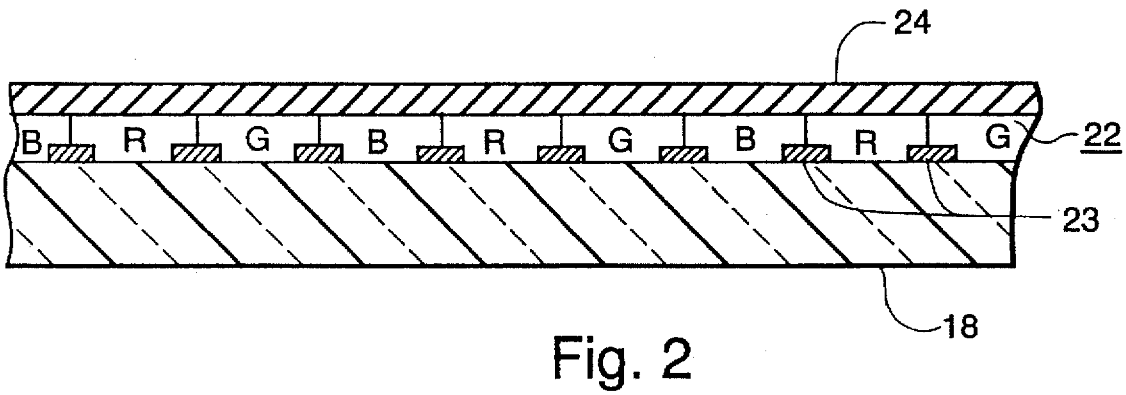
Fig. 2

CODED MARKING ON AN INTERIOR SURFACES OF A CRT FACEPLATE PANEL AND METHOD OF MAKING SAME

This is a division of application Ser. No. 08/287,331, filed Aug. 8, 1994, now abandoned.

The present invention relates to a coded marking, such as a bar code, and to a method of providing such a marking on an interior surface of a faceplate panel of a cathode-ray tube (CRT).

BACKGROUND OF THE INVENTION

In manufacturing a color television picture tube, which is a CRT, it is desirable to be able to identify the tube during the multiple steps in the manufacturing process. U.S. Pat. No. 4,374,451, issued on Feb. 22, 1983 to W. R. Miller, discloses a method for assembling parts of a CRT that includes providing at least one CRT part, such as a glass faceplate panel, with a unique machine-readable marking, such as a bar code, on an external surface thereof. The marking is read one or more times, by machine, during the assembly of the CRT. Each time it is read, a control signal is generated in response to the reading, and then the signal is used to initiate a local process for action with respect to the tube part. The local process may be one or more of selecting and assembling another part to the work-piece, a series of processing steps applied to the work-piece, a recording of historical test data, packing, etc. Markings employed in CRT manufacturing include abraded markings formed in an exterior surface of the work-piece by sandblasting or etching, and marks ablated into the exterior surface, for example, by volatilization as with a laser beam. Markings also have been applied by stenciling, stamping or attaching labels to the surface. A requirement of any marking is that it should have substantially the same characteristics to the ambient as the workpiece itself.

A drawback of conventional markings is that those formed by abrasion or ablation of the surface can be the origin of surface defects which can lead to cracking of the glass. Markings formed by stenciling or stamping may lose optical contrast from contact with chemicals, processing coatings, or through thermal degradation, while attached labels may also become detached. Furthermore, conventional markings require additional processing steps and materials which increase the manufacturing cost of the CRT.

SUMMARY OF THE INVENTION

The invention relates to a novel method for producing a coded marking on an interior surface of a CRT faceplate panel, and to a CRT having such a marking. The CRT faceplate panel comprises a viewing area surrounded by a periphery. A luminescent screen with a plurality of different light-emitting phosphors separated by light-absorbing material is formed on an interior surface of the panel. The method includes the steps of: depositing a suitable photoresist on the interior surface of the panel so that it extends across the viewing area and onto the periphery; illuminating areas of the photoresist on both the viewing area and the periphery with actinic radiation to selectively change the solubility of the photoresist; developing the photoresist to remove the more soluble areas, thereby exposing underlying portions of the interior surface of the panel, while leaving retained areas of less soluble photoresist. The retained areas of the photoresist and the exposed portions of the interior surface of the panel are then overcoated with a light-absorbing material which is dried to form a coating. The light-absorbing coating is developed by removing the retained areas of the photoresist having the overlying light-absorbing material thereon, while leaving the coating of light-absorbing material adhered to the exposed portions of the interior surface of the panel. The developing step forms openings in the light-absorbing material on the viewing area and a coded marking, including a pattern of light-absorbing material and open areas, on the periphery of the panel.

BRIEF DESCRIPTION OF THE DRAWINGS

The invention will now be described in greater detail, with relation to the accompanying drawings, in which:

FIG. 1 is a plan view, partially in axial section, of a color CRT made according to the present invention;

FIG. 2 is a section of a faceplate panel of the CRT of FIG. 1 showing a screen assembly;

DETAILED DESCRIPTION OF THE PREFERRED EMBODIMENTS

Figure 3:
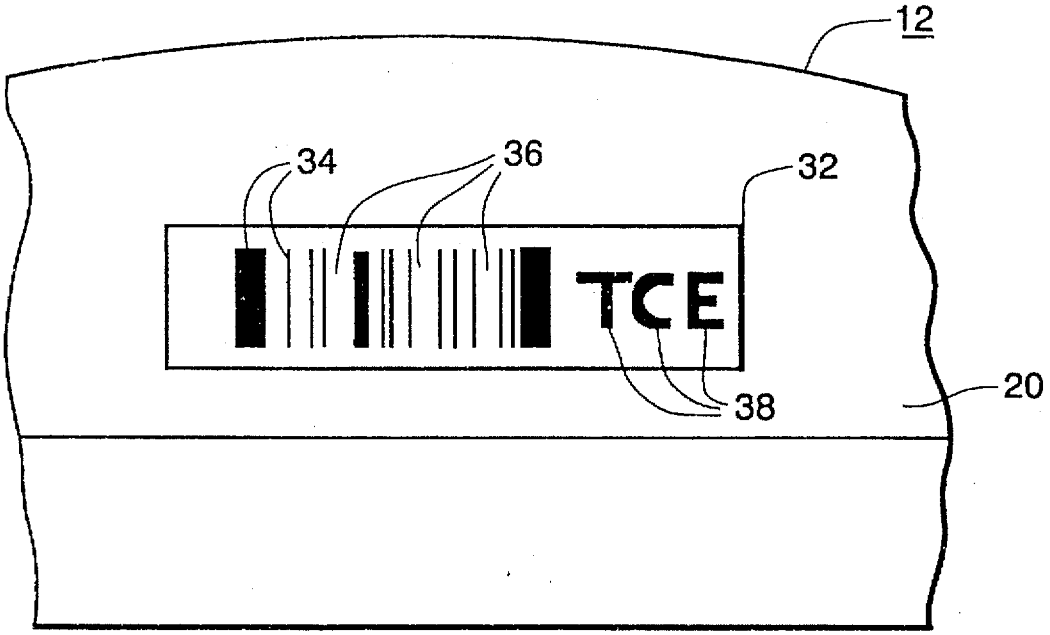
FIG. 3 is a side view of a faceplate panel having a coded marking on the periphery thereof.

FIG. 1 shows a color CRT 10 having a glass envelope 11 comprising a rectangular faceplate panel 12 and a tubular neck 14 connected by a rectangular funnel 15. The funnel 15 has an internal conductive coating (not shown) that contacts an anode button 16 and extends into the neck 14. The panel 12 comprises a faceplate with a viewing area 18 and a periphery or sidewall 20, which is sealed to the funnel 15 by a glass frit 21. A three color phosphor screen 22 is carried on the interior surface of the faceplate viewing area 18. The screen 22, shown in FIG. 2, is a line screen which includes a multiplicity of screen elements comprised of red-emitting, green-emitting and blue-emitting phosphor stripes R, G, and B, respectively, arranged in color groups or picture elements of three stripes or triads, in a cyclic order. The stripes extend in a direction which is generally normal to the plane in which the electron beams are generated. In the normal viewing position of the embodiment, the phosphor stripes extend in the vertical direction. Preferably, at least portions of the phosphor stripes overlap a relatively thin, light absorptive matrix 23, as is known in the art. A dot screen also may be used. A thin conductive layer 24, preferably of aluminum, overlies the screen 22 and extends along at least a portion of the periphery 20 to provide means for applying a uniform potential to the screen, as well as for reflecting light, emitted from the phosphor elements, through the faceplate 18. The screen 22 and the overlying aluminum layer 24 comprise a screen assembly. A multi-apertured color selection electrode or shadow mask 25 is removably mounted, by conventional means, in predetermined spaced relation to the screen assembly.

An electron gun 26, shown schematically by the dashed lines in FIG. 1, is centrally mounted within the neck 14, to generate and direct three electron beams 28 along convergent paths, through the apertures in the mask 25, to the screen 22. The electron gun is conventional and may be any suitable gun known in the art.

The tube 10 is designed to be used with an external magnetic deflection yoke, such as yoke 30, located in the region of the funnel-to-neck junction. When activated, the yoke 30 subjects the three beams 28 to magnetic fields which cause the beams to scan horizontally and vertically, in a rectangular raster, over the screen 22. The initial plane of deflection (at zero deflection) is shown by the line P—P in FIG. 1, at about the middle of the yoke 30. For simplicity, the actual curvatures of the deflection beam paths, in the deflection zone, are not shown.

It is desirable to be able to identify the CRT 10 during the manufacturing operation with a marking that has none of the above-described drawbacks. To this end, a unique coded marking 32, such as that shown in FIG. 3, is provided on the interior surface of the periphery or sidewall 20 of the faceplate panel 12. The marking is made of screen-structure materials, and may take any convenient form, such as one or more letters of the alphabet, a bar code, a numeric identifier, a design or any combination thereof. The example shown in FIG. 3 includes a bar code portion, comprising dark bars 34 and contrasting spaces 36, as well as letters of the alphabet 38. As described hereinafter, the spaces 36 may be made to contrast with the dark bars 34 by filling the spaces 36 with one of the luminescent phosphors or, alternatively, with a portion of the aluminum layer 24. The example is illustrative and not meant to be limiting. For example, the spaces may be made dark with contrasting bars and the letters may be light on a dark background.

Figure 4:
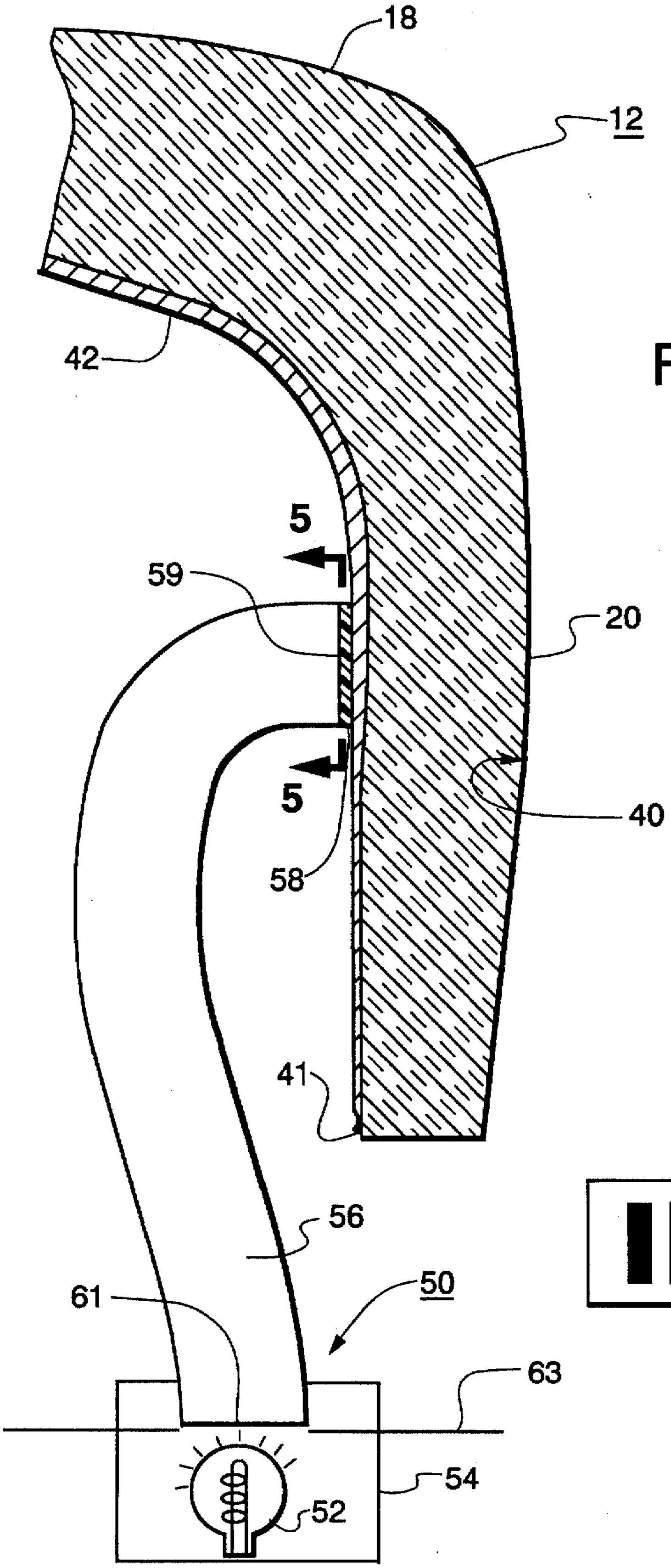
FIG. 4 is a section of a faceplate panel showing one embodiment of a device for providing the coded marking on the periphery of the panel.
Figure 5:
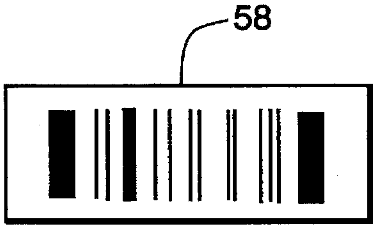
FIG. 5 is a view of a stencil used to provide the coded marking, such as a bar code, taken along line 5—5 of FIG. 4.

FIG. 4 shows a device for manufacturing a coded marking according to the present invention. Initially, the panel 12 is cleaned by washing it with a caustic solution, rinsing it in water, etching it with buffered hydrofluoric acid and rinsing it again with water, as is known in the art. A suitable photoresist solution, such as polyvinyl alcohol, a dichromate, and water, as described in U.S. Pat. No. 3,558,310, issued to Mayaud on Jan. 26, 1971, is applied to the interior surface of the panel 12, including at least a portion of the periphery 20 between a mold-match line 40 and the viewing area 18 of the faceplate 12; however, the solution may extend to a sealing edge 41. The mold match line 40 is a line formed during the faceplate molding process. Glass forward of the mold match line is offset and lies at a small angle with respect to the portion of the faceplate that is sealed to the funnel to improve the glass molding process. Preferably, the photoresist solution is applied by spin coating, and the solution is dried to form a photoresist layer 42. The photoresist may be either a positive or negative photoresist. The photoresist upon illumination by UV light changes its solubility characteristics. With a negative photoresist, exposure to light results in cross linking of the molecules in the photoresist, making the exposed or illuminated areas of the photoresist less soluble in appropriate solvents than the non-illuminated areas. In one method for providing the coded marking 32, the photoresist layer 42 is illuminated with actinic radiation from a marking device 50 comprising a light source 52 within a housing 54. A light pipe 56 extends between the housing 54 and the photoresist layer 42. A suitable coded marking mask 58, bearing the coded information, is disposed between an end 59 of the light pipe 56 and the photoresist layer 42 formed on the periphery 20 the panel 12. The other end 61 of the light pipe 56 is disposed within the housing 54. A shutter 63 controls the light exposure of the photoresist layer 42 on the periphery 20 of the panel 12, through the coded marking mask 58. The light pipe 56 confines the light so that it is incident only on the photoresist layer 42 after passing through the transparent portions of the coded marking mask 58. The light from the light source 52 within the housing 54 selectively alters the solubility of the photoresist layer 42 on the periphery of the panel. One example of a coded marking mask 58 having a bar code is shown in FIG. 5. After exposure of the peripheral portion of the photoresist layer through the mask 58, the shadow mask 25 is affixed into the panel 12, and the shadow mask-panel assembly is placed onto a conventional three-in-one lighthouse (not shown) which exposes the photoresist layer on the viewing area 18 to actinic radiation from a light source within the lighthouse. The lighthouse light source projects light through the openings in the shadow mask, as is known in the art. The exposure of the photoresist layer on the viewing area is repeated two more times with the light source located to simulate the paths of the electron beams from the three electron guns. The configuration of the lighthouse and the sides of the shadow mask shield the photoresist layer 42 on the periphery 20 of the panel 12 from light during the exposure of the photoresist layer on the viewing area 18 of the panel 12. The light from the lighthouse selectively alters the solubility of the exposed areas of the photoresist layer on the viewing area 18, where phosphor materials subsequently will be deposited. After the third exposure, the panel is removed from the lighthouse and the shadow mask is removed from the panel.

Figure 7:
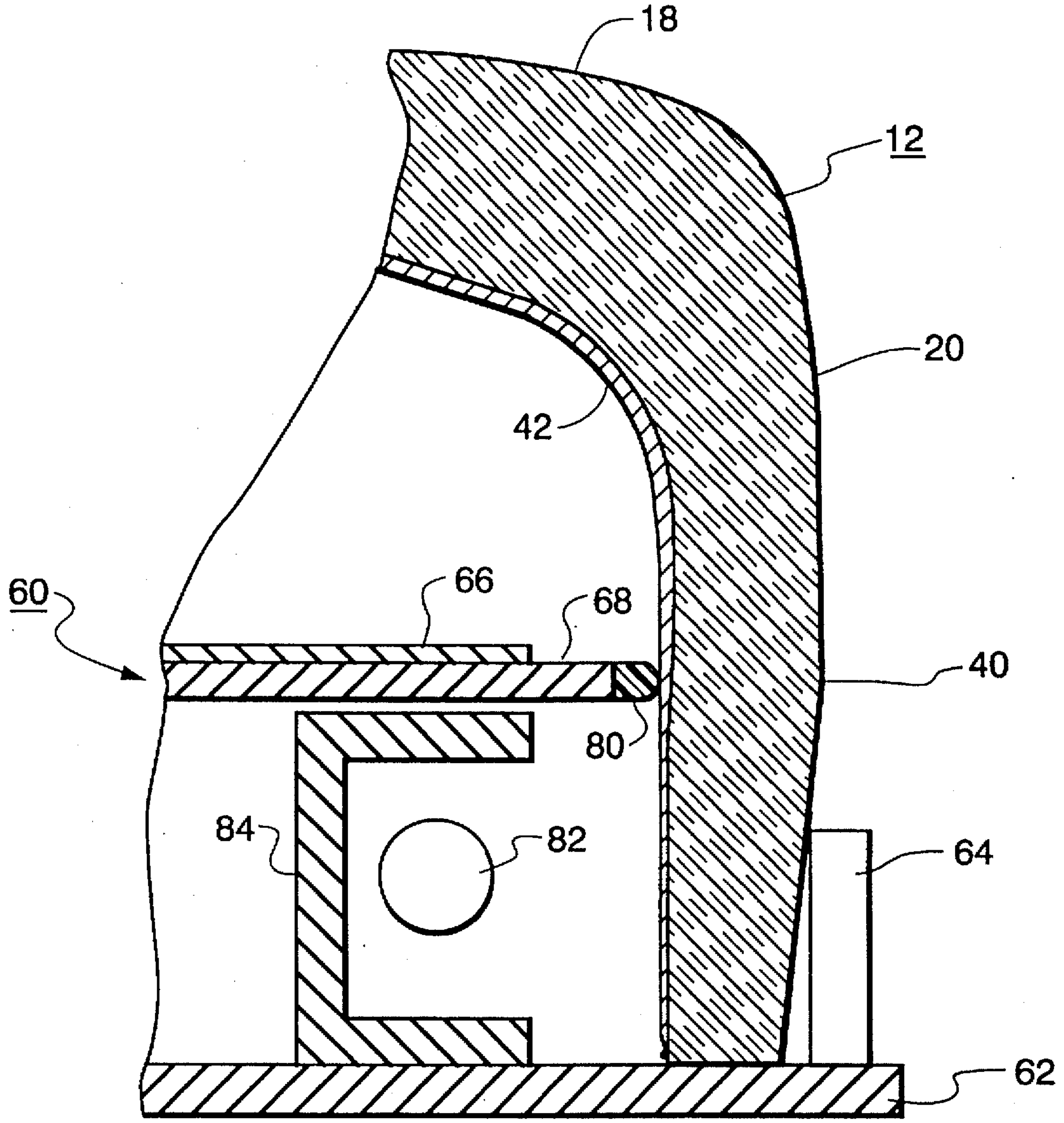
FIG. 7 is a section of a faceplate panel showing an expandable trimming device for exposing photoresist on the lower portion of the periphery of the panel.
Figure 8:
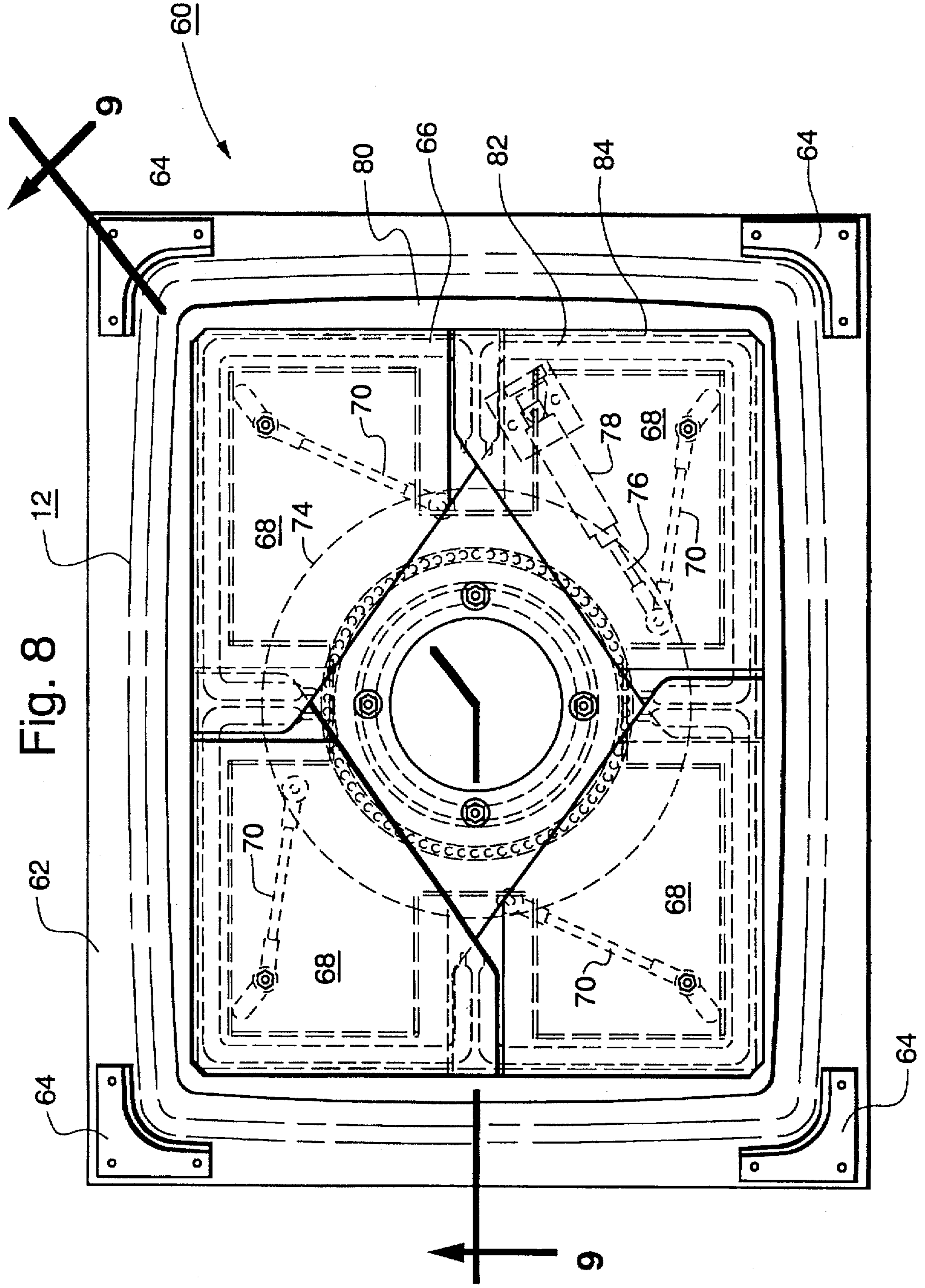
FIG. 8 is a plan view of the faceplate panel on the trimming device of FIG. 7, with the expansion mechanism of the device in the retracted position.
Figure 9:
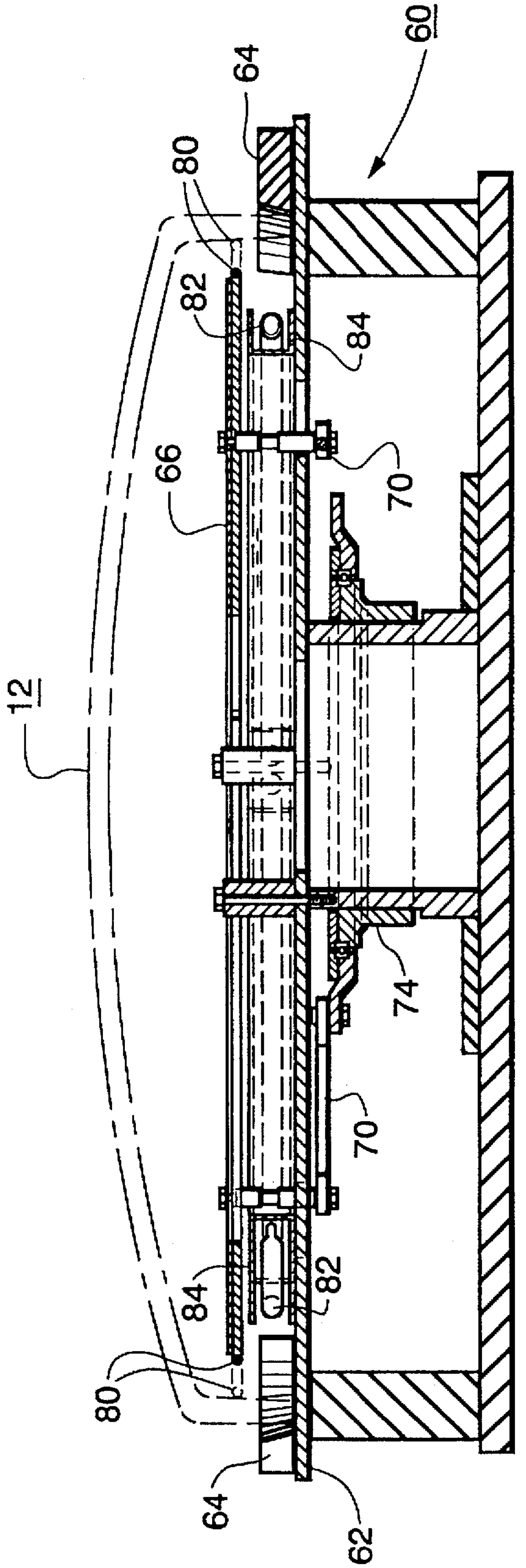
FIG. 9 is a sectional view of the faceplate panel on the expandable trimming device taken along line 9—9 of FIG. 8.

To facilitate removal of the photoresist layer 42 from the lower portion of the periphery 20 of the panel 12, below the mold match line 40, the panel is placed on a light trimming device 60, shown in FIGS. 7–9. The light trimming device 60 includes a rectangular support plate 62 configured to hold the faceplate panel 12. A panel positioning block 64 is located at each of the corners of the plate 62. A retractable light shield 66 is mounted in spaced relation to the plate 62 and extends within the interior of the panel 12. FIG. 8 shows the light trimming device 60 in the retracted position. As shown in FIG. 8, each of four interleaved plates 68 is connected to one end of a separate crank 70. The opposite end of each of the cranks 70 is connected to a bearing disk 74 which is driven by a drive crank 76 connected to an air cylinder 78. A resilient gasket 80 is circumferentially disposed around the periphery of the interleaved plates 68. In the extended position, shown in FIG. 7, the gasket 80 contacts photoresist layer 42 along the interior wall of the panel and forms a light-tight seal therewith, so that UV light from a light source 82 illuminates only the lower portion of the photoresist layer. The previously illuminated portions of the photoresist layer 42 on the viewng area 18 and on the periphery of the panel, where the coded marking is to be located, are above the gasket 80 and are not re-illuminated during the trimming operation. The light source 82 comprises four light tubes, one for each quadrant, which extend circumferentially around the perimeter of the trimming device, adjacent to the inner wall of the panel, to uniformly illuminate the photoresist layer 42 on the lower portion of the internal wall. A light baffle 84 encloses three sides of the light source 82 to further prevent unwanted illumination of the portion of the photoresist layer 42 above the trimming device 60.

The present trimmer differs from prior trimmers which use a light shield of fixed size that is closely configured to the interior dimensions of the faceplate panel. The fixed light shields of prior trimmers must provide sufficient clearance to permit the panel to be loaded onto the trimming device without damaging the photoresist layer on the sidewall of the faceplate panel. Thus, they cannot totally restrict the light to the lower porition of the panel sidewall, and some light leaks around the edge of the trimmer light shield into the top portion of the panel, thereby at least partially illuminating some of the photoresist layer above the trimmer and providing a non-uniform edge. Also prior trimmers do not utilize a circumferential light source to uniformly illuminate the photoresist layer. One example of a prior trimmer with the above-described limitations is shown in U.S. Pat. No. 4,021,819, issued on May 3, 1977 to Barczynski et al.

After the light trimming operation, the panel is removed from the trimming device 60 and the photoresist layer 42 is developed to remove the more soluble areas of the photoresist layer on both the viewing area and on the periphery, thereby exposing the underlying interior surface of the faceplate and leaving the less soluble, exposed, i.e., illuminated areas intact. Water may be used to flush away the more soluble, non-illuminated areas of the photoresist layer. Then, a suitable solution of light-absorbing material, such as an aqueous suspension of graphite, is uniformly overcoated onto the interior surface of the faceplate to cover the exposed portion of the faceplate on both the viewing area and the periphery, and the retained, less soluble, areas of the photoresist layer 42. The solution of light-absorbing material is dried and developed using a suitable oxidizing solution, such as aqueous hydrogen peroxide, which will penetrate the dried light-absorbing material to dissolve and remove the retained portion of the photoresist layer and the overlying light-absorbing material thereon, while leaving intact the light-absorbing material adhered to the interior surface of the panel 12. The developing step forms windows in the light-absorbing matrix layer which is adhered to the viewing surface of the faceplate and also forms the coded marking 32, which includes a pattern of light-absorbing material 34 and open areas 36 ,on the periphery of the panel. Additionally, the developing step removes the retained photoresist layer on the lower periphery of the panel illuminated by the light trimming device, and the overlying light-absorbing coating thereon to provide a well defined edge to the light-absorbing coating and a clear sidewall adjacent to the sealing edge.

Figure 6:
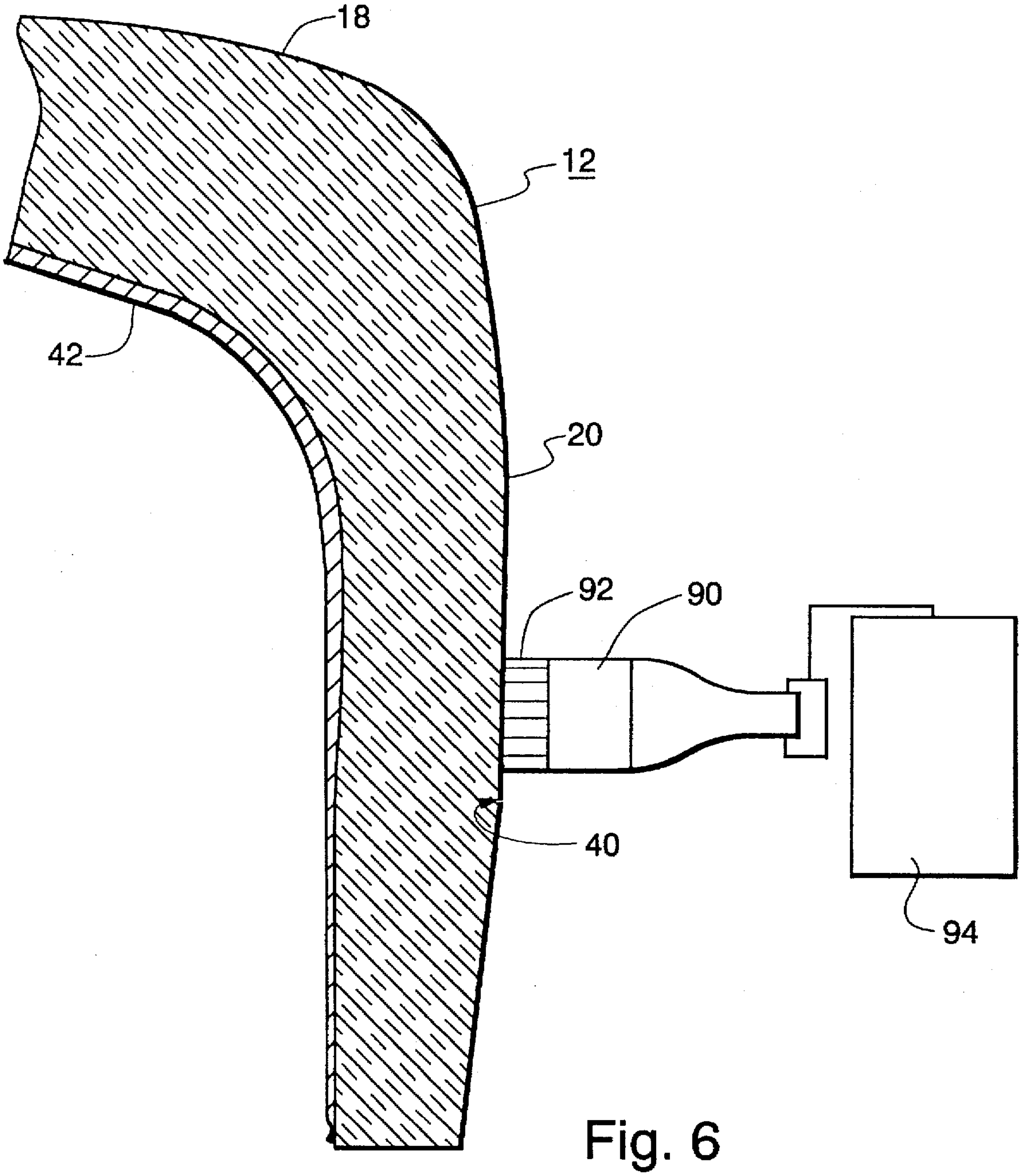
FIG. 6 is a section of a faceplate panel showing a second device for providing a coded marking on the periphery of the panel.

A second embodiment of the present invention is shown in FIG. 6. To form the coded marking on the periphery 20 of the panel 12, a CRT 90 with a fiber optic faceplate 92 is utilized. The CRT 90 has a UV-emitting phosphor screen of suitable persistance, to provide actinic radiation through the fiber optic faceplate of the CRT to develop the photoresist layer 42 on the periphery on the interior surface of the panel 12. The fiber optic faceplate 92 provides substantially coherent illumination to the layer 42. The CRT 90 is connceted to a suitable controller 94 which provides information to the electron gun of the CRT. The information on the screen of the CRT 90 is transmitted through the glass of the sidewall of the panel 12 to illuminate the photoresist layer 42. The information displayed by the CRT 90 may comprise letters of the alphabet, bar code, numerical indicia, symbols, or any combination thereof. After the photoresist layer 42 on the periphery is illuminated with information to form the coded marking, the exposure of the photoresist layer on the viewing area 18 and the trimming of the sidewall are carried out as described in the example above.

It is intended that the process for providing a coded marking not be limited to the two processes described herein, but may be extended to include variations of these processes. For example, rather than using a CRT with a fiber optic faceplate, a fiber optic cable (not shown) may be disposed between a light source and the outside surface of the periphery of the panel 12. The image of a coded marking mask of the type described in the first embodiment may be transmitted through the fiber optic cable to illuminate the photoresist layer on the interior periphery of the sidewall.

Subsequent processing of the screen 22 is conventional. A photosensitive slurry of a first color-emitting phosphor material, for example green, is applied uniformly to the interior surface of the panel 12 and dried. The shadow mask 25 is inserted into the panel 12, and the panel is placed onto a lighthouse which directs light through the apertures in the mask to illuminate areas of the dried, green-emitting phosphor material. The incident angle of the light corresponds to the incident angle of the electron beam that will impinge upon the green-emitting phosphor. The green-emitting phosphor is developed by removing the more soluble, non-illuminated area thereof, while leaving the less soluble, illuminated areas of the green-emitting phosphor within the windows formed in the matrix for the green-emitting phosphor. The process is repeated twice more, once for the blue-emitting phosphor and again for the red-emitting phosphor. The interior surface of the panel is then aluminized to provide an electrical contact to the screen as well as a reflective coating that directs the light from the screen outwardly through the viewing area of the faceplate.

When the phosphor slurry is applied to the interior surface of the panel, the shadow mask restricts the light from the lighthouse to the viewing area of the screen, so that the phosphor in the open areas of the coded marking is not illuminated and remains soluble. Accordingly, the developing step will remove the more soluble phosphor from the open areas of the coded marking. However, the step of aluminizing the interior surface of the panel, to form the aluminum layer 24, also provides sufficient aluminum which overlies the coded marking so that the open areas of the marking will be covered with aluminum. When viewed from the outside of the panel, the coded marking on the sidewall will comprise dark areas, or bars 34 of light-absorbing material and contrasting light areas, or spaces 36 of aluminum. Alternatively, when the first color-emitting phosphor slurry is applied to the interior surface of the panel, it will cover both the viewing area and the coded marking on the periphery. After the exposure of the viewing area through the shadow mask, the coded marking may be illuminated by projecting light from a separate light source located adjacent to the exterior of the panel sidewall, through the open areas of the coded marking, to render the phosphor within the open areas less soluble. Development of the phosphor will then remove the more soluble, non-illuminated area of the phosphor, leaving phosphor in selected ones of the opening in the matrix and in the open areas of the coded marking. The panel is then aluminized as before. In this case, the coded marking will comprise dark bars 34 of light-absorbing material and contrasting spaces 36 of phosphor material. If the coded marking is a bar code, it can be read with conventional bar code readers.

The advantage of the present marking and method is that the marking is formed of the same materials that are used to manufacture the luminescent screen, and, thus, the coded marking is compatible with all phases of the tube manufacturing process, and with tube operation.

What is claimed is:

1. In a method of providing a coded marking on a CRT faceplate panel having a viewing area and a periphery with a mold-match line and a sealing edge, said viewing area including a luminescent screen having a plurality of different light-emitting phosphors, the improvement wherein said method comprising the steps of:

depositing a suitable negative photoresist on an interior surface of said panel, said negative photoresist extending across said viewing area and onto said periphery;

illuminating, imagewise, areas of said negative photoresist on both said viewing area and said periphery, between said viewing area and said mold-match line, with actinic radiation to selectively change the solubility thereof;

contacting said periphery of said interior surface of said panel between said mold-match line and said sealing edge with an expandable light shield of a light trimming device and illuminating said negative photoresist between said mold-match line and said sealing edge with actinic radiation to change the solubility thereof;

developing said negative photoresist to remove the more soluble areas thereby exposing underlying portions of said viewing area and said periphery of said panel while leaving retained areas of less soluble negative photoresist;

overcoating the retained areas of less soluble negative photoresist and the exposed portions of said viewing area and said periphery of said panel with a light-absorbing material;

drying said light-absorbing material to form a coating which overlies the retained areas of less soluble negative photoresist and is adhered to the exposed portions of said viewing area and said periphery of said panel;

patterning said light-absorbing coating by removing the retained areas of less soluble negative photoresist with said overlying light-absorbing material thereon while leaving said coating of light-absorbing material adhered to the exposed portions of said viewing area and said periphery of said panel, thereby forming openings in said light-absorbing material on said viewing area, a coded marking including a pattern of light-absorbing material and uncoated areas on said periphery of said panel between said viewing are and said match mold line, and a clear sidewall from to said sealing edge to said match mold line;

serially depositing said different light-emitting phosphors onto said viewing area of said panel, each of said different light-emitting phosphors being deposited into adjacent openings formed in said viewing area; and aluminizing said viewing area and said coded marking, whereby said coded marking is readable from said exterior surface of said panel.

2. The method as described in claim 1, wherein said negative photoresist on said periphery of said panel and on said viewing area is illuminated, serially, with said negative photoresist on said periphery being illuminated before said negative photoresist on said viewing area is illuminated.

3. The method as described in claim 2, wherein means are provided for confining said illumination to said negative photoresist on said periphery of said panel.

4. The method as described in claim 3, wherein said means for confining said illumination comprising coupling means for transmitting coded information to said negative photoresist on said periphery of said panel.

5. The method as described in claim 4, wherein said coupling means for transmitting coded information is selected from the group consisting of a mask having light transmissive and non-transmissive areas, and a CRT for projecting coded markings onto said negative photoresist on said periphery of said panel.

6. The method as described in claim 1, wherein at least one of said open areas of said coded marking is filled with one of the light-emitting phosphors.

* * * * *